S. E. McKNIGHT.
VALVE.
APPLICATION FILED OCT. 29, 1909.
959,784.
Patented May 31, 1910.
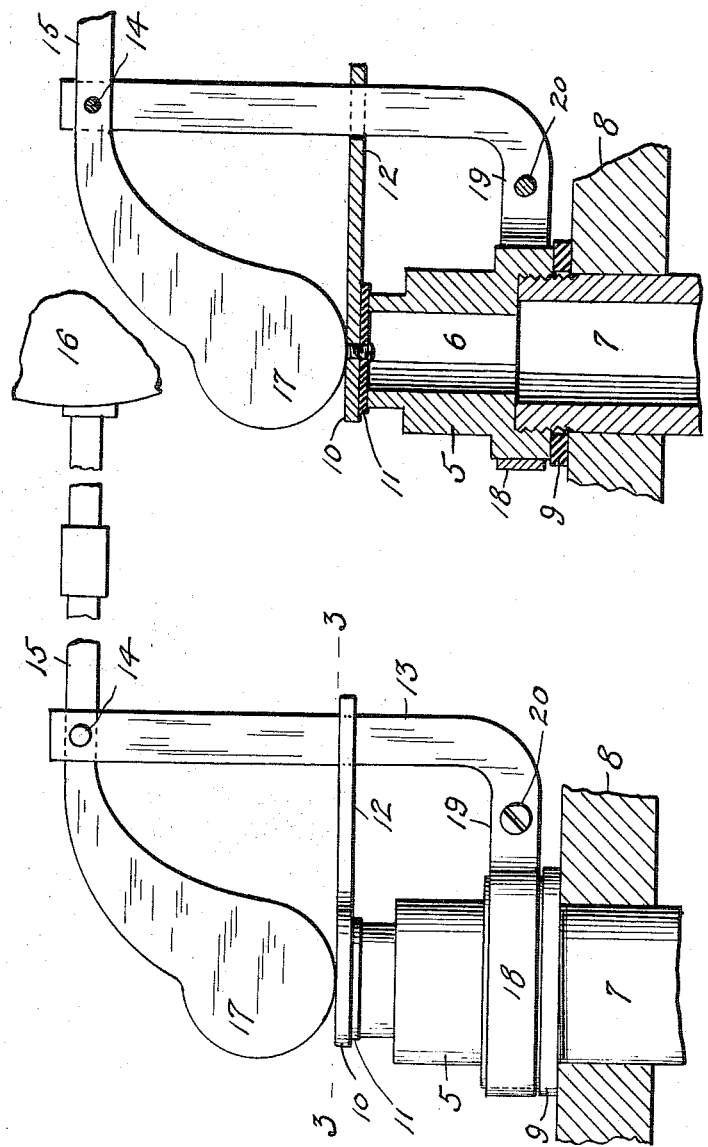
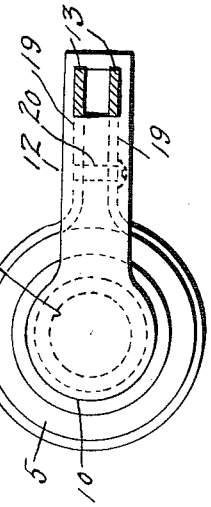
Witnesses
D. H. McLeod.
R. Schmidt.
Inventor
S. E. McKnight
By Max A Schmidt
Attorney

UNITED STATES PATENT OFFICE.

SAMUEL E. McKNIGHT, OF LOHN, TEXAS.

VALVE.

959,784. Specification of Letters Patent. Patented May 31, 1910.

Application filed October 29, 1909. Serial No. 525,271.

*To all whom it may concern:*

Be it known that I, SAMUEL E. MC-KNIGHT, a citizen of the United States, residing at Lohn, in the county of McCulloch and State of Texas, have invented certain new and useful Improvements in Valves, of which the following is a specification.

This invention relates to that class of valves which are employed in connection with tanks, to control the filling thereof, and which are automatically closed by a float lever; and it is the object of the invention to provide a valve of this kind which is simple in construction, and efficient in operation.

Another object of the invention is to provide a valve which can be readily applied to the supply-pipe of the tank.

Another object is to provide a structure in which the valve proper has a sliding movement toward and from its seat, the valve being so mounted, and engageable by the float-lever, that a positive closure is effected.

With these objects in view, the invention consists in a novel construction and arrangement of parts to be hereinafter described and claimed, reference being had to the drawing hereto annexed, in which—

Figure 1 is an elevation of the valve, the bottom of the tank to which it is applied, being shown in section. Fig. 2 is a central vertical section of the valve. Fig. 3 is a section on the line 3—3 of Fig. 1.

In the drawing, 5 denotes the valve-body, the same having an opening 6 through which the water flows. One end of the opening is counterbored, and screw-threaded, so as to screw on the supply-pipe 7 of the tank, the bottom of which is indicated at 8. The other end of the valve-body forms a seat for the valve proper. The pipe 7 extends through an opening in the tank bottom 8, and the valve-body is screwed down against the said bottom, a gasket 9 being interposed therebetween, to make a water-tight joint.

The valve proper is a disk 10, which is faced with a disk 11 of rubber or other suitable material to engage the seat. The disk 10 is formed with an arm 12, having an opening, by means of which it is mounted to slide up and down on a guide 13, to which is pivoted, at 14, a lever 15, carrying at one end a float 16, and having at its other end a head or enlargement 17 adapted to engage the back of the disk 10, and press the disk 11 on its seat. The valve-body is encircled by a band 18, having at its ends outstanding ears 19, through which passes a screw 20, for drawing the ears together, and thus clamping the band on the valve-body. The guide 13 is an upstanding continuation of the ears 19. The head 17 engages the disk 10 at its center, so that the disk 11 is held squarely to its seat. The arm 12, although sufficiently loose on the guide 13 to slide freely up and down thereon, is not loose enough thereon as to permit the valve to tilt forwardly, rearwardly or sidewise, thus assuring its seating squarely, and effecting a tight closure at all times. When the disk 11 becomes worn, it can be removed, and renewed.

In operation, when the water level in the tank drops sufficiently so as to permit the lever 15 to swing in a direction to release the valve, the head 17 then moving away from the disk 10, the latter is pushed upwardly by the pressure in the pipe 7, and the valve is thus opened, and the water flows into the tank. When the float is elevated by the filling of the tank, the head 17 is forced downwardly against the disk 10, and the latter is moved to its seat, and held thereon, thus shutting off the water. The disk moves in a right line toward and from the seat, and its being properly seated is thus assured.

A valve constructed as herein described is devoid of complicated parts to get out of order, and it can be readily applied. The valve-body serves as a reducer, and by making it in different sizes, it can be fitted to different-sized pipes. The band 18 is adjustable on the valve-body, so that the float-lever may be placed in the most convenient position within the tank.

I claim:

1. A valve comprising a body having a seat at one end, a guide carried by the body, a disk engageable with the seat, an arm on the disk having an opening to receive the guide, said arm being slidable on the guide in a right line toward and from the seat, and a float lever engageable with the back of the disk.

2. A valve comprising a body having a seat at one end, a disk engageable with the seat, a band encircling the body, and adjustable thereon, standards rising from the band, an arm on the disk having an opening to receive the standards, said arm being slidable on the standards toward and from the seat, and a float lever fulcrumed on the standards, and engageable with the back of the disk.

3. A valve comprising a body having a seat at one end, a disk engageable with the seat, a band encircling the body, ears projecting from the ends of the band, a clamping means passing through the ears for adjustably securing the band on the body, standards rising from the ears, an arm on the disk having an opening to receive the standards, said arm being slidable on the standards toward and from the seat, and a float lever fulcrumed on the standards, and engageable with the back of the disk.

In testimony whereof I affix my signature in presence of two witnesses.

SAMUEL E. McKNIGHT.

Witnesses:
  W. McShan,
  C. R. Alexander.